Patented June 9, 1936

2,043,938

UNITED STATES PATENT OFFICE 2,043,938

METHOD OF PRODUCING MOLDED PRODUCTS

Herman R. Thies, Akron, Ohio, assignor to Wingfoot Corporation, Akron, Ohio, a corporation of Delaware No Drawing. Application August 16, 1933, Serial No. 685,415

2 Claims. (Cl. 18—48.8)

This invention relates to the production of molded products of thermoplastic materials such as cellulose acetate, cellulose nitrate, vinyl and styrol resins and derivatives of rubber, portions of which are transparent or substantially transparent and other portions of which are opaque; particularly the production of such products in which the transparent and opaque portions are differently colored.

By the process of this invention various attractive color effects may be obtained. Mottled or marbleized products and other multicolored products such as flat sheets, umbrella handles, gear shift knobs, etc. may be produced in which there is a sharper division of colors than commonly occurs in the mottled or marbleized products now available in resins of the type of the phenolics and casein products. The portions of the molded articles which are transparent may be colored with soluble coloring matter. The opaque portions may be colored with an insoluble coloring matter or if soluble coloring matter is employed some filler such as zinc oxide, etc. is incorporated in these portions to make them opaque. Because of the transparency of the one portion and the opacity of the other portion, particularly where these are colored with contrasting colors, the line of division between the two portions is sharply drawn.

If one wishes to obtain a molded article which is essentially transparent, a mixture of molding powders containing a large amount of the substantially transparent molding material is employed. If, on the other hand, an article which is essentially opaque is desired a mixture is used in which the opaque molding material predominates.

A thermoplastic rubber derivative suitable for molding according to this invention may be prepared by dissolving plasticized pale crepe rubber in sufficient benzene to produce a rubber cement containing 10% of rubber based on the weight of the benzene. The rubber is preferably plasticized by milling to a condition such that a $\frac{2}{16}$ cu. in. sample when placed on a flat plate beneath a flat 10 kilogram weight for 3½ minutes in a cabinet heated to a temperature of 70° C. is flattened out to a thickness slightly less than ⅛ inch. This corresponds to a plasticity in the neighborhood of 300 as measured by a Williams plastometer.

350 gallons of the rubber cement so prepared are then placed in a steam jacketed Day mixer equipped with a reflux condenser. 10% of hydrated chlorostannic acid ($H_2SnCl_6.6H_2O$), based on the weight of the rubber in the cement, is added. The chlorostannic acid may be conveniently prepared by adding sufficient aqueous hydrochloric acid to tin tetra chloride to provide the water necessary for the formation of the hydrate and then saturating with hydrogen chloride gas at room temperature. The mixture of cement and chlorostannic acid is heated and agitated for about 3 hours at a temperature near the boiling point of the solvent, preferably between 65 and 80° C. After 3 hours the reaction mixture is sampled every few minutes and the viscosity of the sample is determined. The time required to produce a reaction mixture of any desired viscosity will vary somewhat with each batch depending upon the nature of the rubber, etc. The reaction is continued until the conversion product has a viscosity of 0.20 plus or minus 0.10 minutes, as measured by a Gardner mobilometer. By this instrument, viscosity is measured in terms of the time in minutes required for a plunger of known weight and area to fall a known distance in a cylinder of known volume which contains the test sample. The clearance between the plunger and wall of the cylinder is also known. This reading is determined at a given temperature, e. g. 25° C. The mobilometer used had the following dimensions:

| | | |
|---|---|---|
| Thickness of plunger disc | inches | 0.066 |
| Diameter of plunger disc | do | 1.502 |
| Diameter of plunger shaft | do | 0.248 |
| Inside diameter of cylinder containing test sample | inches | 1.535 |
| Weight of cylinder | do | 9.0 |
| Length of plunger shaft | do | 20.0 |
| Distance between two marks on the plunger shaft | inches | 7.484 |
| Total weight of the shaft, top weight and disc | grams | 68.6 |

When the desired viscosity has been obtained the reaction is stopped, either by the addition of 40 grams of caustic soda in water solution per pound of chlorostannic acid used in the reaction or by the addition of one-half pound of water per pound of chlorostannic acid used. The filtered solution is charged into somewhat more than an equal volume of water at ordinary temperature; about 2½ gallons of water for each gallon of the reacted cement being satisfactory. The water is vigorously agitated during the addition of the reacted cement.

Steam is then introduced into the water-cement mixture at such a rate that the vapor temperature in an ordinary column extending from the reactor to a condenser reaches 154° F. in 40 minutes. During the next 30 minutes the temperature is maintained at 154° F. during which interval the majority of the solvent distills over into a condenser. The temperature is then increased to 210° F. in the next 50 minutes and permitted to remain there for another 25 minutes during which practically all of the remainder of the solvent distills off. The chlorostannic acid conversion product is thus precipitated in a finely divided, sand-like form. It is centrifuged, washed with water and dried in a vacuum. It contains no more than a trace of tin and apparently has a (C₅H₈)x structure but with a higher percentage of the carbon atoms directly united than in rubber, because it is more saturated. It is a condensation derivative of rubber. It contains some chlorine, apparently due to the addition of hydrogen chloride during the chlorostannic acid reaction. It is thermoplastic and when molded gives a non-tacky product. The production of such a product is covered by copending applications which include Kurtz 680,982, filed July 18, 1933, Thies and Lyon, 699,634, filed November 24, 1933, and Sebrell 654,248, filed January 30, 1933.

To produce the mottled or marbleized or other color effects according to the process of this invention, the powder is divided into two or more parts. To one portion soluble coloring matter may be added; for example, a benzol soluble dyestuff which is stable at the molding temperature. The dyestuff is advantageously mixed with the rubber derivative by milling on a rubber mill preferably at a temperature of 250 to 325° F. An opaque material, for example, insoluble coloring matter, such as carbon black or titanium oxide, etc. is added to another portion of the rubber derivative, preferably by milling. Two or more different insoluble coloring materials may be separately milled into different portions of the rubber derivative, if desired. Or insoluble fillers such as asbestos, mica and the like may be added to the portion or portions which are made opaque and these may be colored with soluble or insoluble coloring matter. In molded products which contain no soluble coloring matter in the opaque portion a sharper line of division is obtained than where soluble coloring matter is employed. The transparent and opaque portions are separately crushed or ground or otherwise reduced to a condition suitable for molding. They are then mixed and molded in suitable forms by pressing at, for example, 1000 pounds pressure while heating to 200 or 300° C. or higher.

Molding materials which have identical molding properties may be employed or a pleasing effect may be produced by using powders having slightly different softening points. In the latter case one portion may, for example, be colored with a soluble dyestuff and the other with an insoluble pigment or the transparent portion may be left uncolored and the other portion made opaque by the addition of asbestos powder or other filler. The higher softening point may be produced by carrying the chlorostannic acid reaction to a further extent to produce a product with a lower viscosity.

Using a mixture of powders having different softening points, desirable effects may be produced by shaping the powder with the higher softening point before mixing it with the powder of lower softening point. The powder of higher softening point may, for example, be formed into cubes or spheres or flat plates. It may be of any desired shape. When mixed with the material of lower softening point and subjected to heat and pressure in a mold, if the temperature is so controlled as to soften the material having the lower softening point without appreciably softening the material of higher softening point, the softer material will flow and fill the mold and the shape of the particles of the harder material will be changed little, if at all, during the molding operation.

Various effects can be obtained in this way by varying the particle size and shape of the material of higher softening point.

A somewhat similar effect may be produced by plying up several sheets of material of different softening point. These may be colored with different coloring matters. For example, those of one softening point may be colored with a soluble dyestuff and those of the other softening point may be colored with insoluble coloring material. Sheets of higher softening point colored with an insoluble coloring matter may be alternated with sheets of lower melting point colored with a soluble dyestuff. If the sheets are made of a moldable rubber derivative they may be cemented together by brushing each with benzol and applying pressure after stacking. The composite sheet thus formed may then be sliced and the slices subjected to molding. As an alternative method differently colored sheets of the material of higher softening point may be thus plied up and sliced and the slices of the composite material may then be mixed with a molding powder of lower softening point and subjected to molding.

To produce a still different effect two molding powders of higher melting point may be differently colored, for example, one may be colored with carbon black and another with iron oxide, and these powders may be mixed with a powder of lower melting point colored with a soluble dyestuff such as a soluble green dye and the mixture subjected to molding under heat and pressure.

If the molding material is a rubber derivative manufactured as described above it may be colored green with 1-4-di para tolyl amino anthraquinone. Various pleasing color effects may be obtained by using these and other coloring materials. Chrome green and ultramarine blue may be used as insoluble coloring materials. Soluble dyestuffs which may be used include the following which give the colors indicated: (red) xylol-azo-xylol-azo-beta naphthol (yellow) ortho-anisole-azo-phenylmethyl pyrazolone and (blue) 1-methyl-amino-4-paratolyl-amino-anthraquinone. In general, any oil soluble dye will dissolve in such a rubber derivative.

To produce a still different effect a thin sheet of molding material colored with one color may be placed upon a much thicker sheet of molding material of substantially the same softening point, but colored differently, one of the sheets being colored with a soluble dyestuff and the other with insoluble coloring matter. The two sheets may then be rolled and calendered in the way tile stock is marbleized to produce a sheet in which the color of the thinner sheet appears dispersed in the color of the thicker sheet. The material is calendered at an elevated temperature and after cooling is used as a sheet or it is ground to a powder and the powder thus produced subjected to molding.

If the article to be formed is one which may readily be molded from a blank the differently colored thermoplastic materials may be supplied to a blank forming machine, such as a tube machine which comprises a mixer for thoroughly mixing the thermoplastic materials and a die through which the blanks are extruded. Using different dies blanks suited for various purposes may be formed, for example, a cylindrical blank to be cut in sections and used for molding gear shift knobs or an annular die for tubing which by slitting may be used for covering more or less cylindrical bodies such as the steel framework of a steering wheel, etc.

By various methods of mixing the differently colored thermoplastic materials described herein, molded articles of a great variety of different shapes and sizes and color combinations may be formed.

Articles formed by molding a rubber derivative containing a $(C_5H_8)x$ structure with a higher percentage of the carbon atoms directly united than in rubber, are advantageously soaked in chlorine water for about ten minutes to render the surface more impervious to greases, etc.

What I claim is:

1. The method of producing molded products from thermoplastic condensation derivatives of rubber which comprises plying up differently colored sheets of such material, certain sheets having a higher softening point than other sheets, and then subjecting a section of the composite sheet thus formed to molding.

2. The method of producing molded products from thermoplastic condensation derivatives of rubber which comprises plying up differently colored sheets of such material, certain sheets having a higher softening point than other sheets and sheets of one softening point being dyed with a soluble dyestuff and sheets of another softening point being colored with insoluble coloring material, and then subjecting a section of the composite sheet thus formed to molding.

HERMAN R. THIES.